(Model.) 3 Sheets—Sheet 1.
B. L. STOWE.
Automatic Car Brake.
No. 231,116. Patented Aug. 10, 1880.
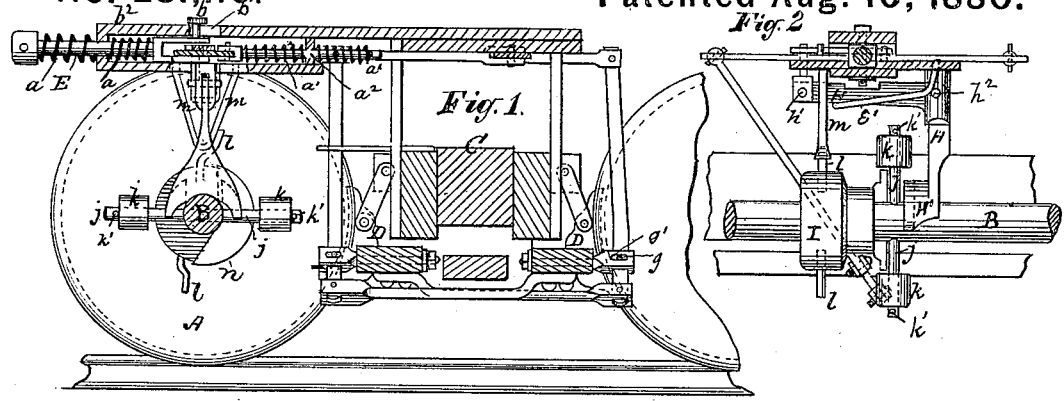
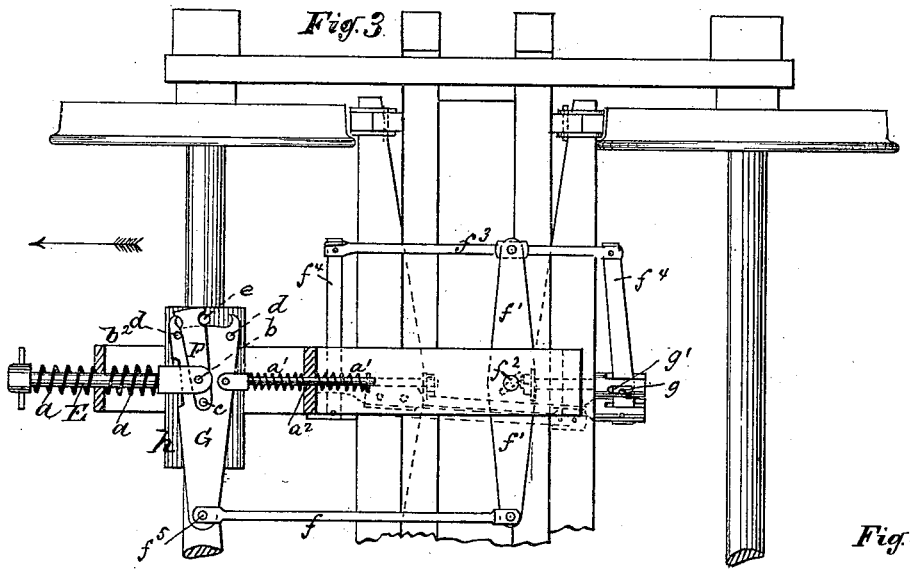
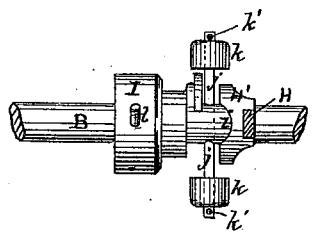
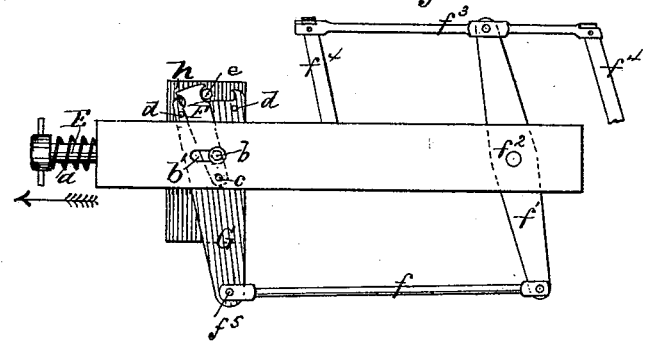
Witnesses:
Henry Eichlings
Nathan Stowe
Inventor:
Benjamin L. Stowe
N. PETERS, PHOTO-LITHOGRAPHER, WASHINGTON, D. C.

(Model.) 3 Sheets—Sheet 2.

B. L. STOWE.
Automatic Car Brake.

No. 231,116. Patented Aug. 10, 1880.

Witnesses:
Henry Cuthling
Nathan Stowe

Inventor
Benjamin L. Stowe (Model.)

3 Sheets—Sheet 3.

B. L. STOWE.
Automatic Car Brake.

No. 231,116. Patented Aug. 10, 1880.

Witnesses:
Henry Eichling
Nathan Stowe

Inventor:
Benjamin L. Stowe

UNITED STATES PATENT OFFICE.

BENJAMIN L. STOWE, OF NEW YORK, N. Y., ASSIGNOR TO J. VAN D. REED, OF SAME PLACE.

AUTOMATIC CAR-BRAKE.

SPECIFICATION forming part of Letters Patent No. 231,116, dated August 10, 1880.

Application filed April 15, 1880. (Model.)

*To all whom it may concern:*

Be it known that I, BENJAMIN L. STOWE, of the city, county, and State of New York, have invented certain new and useful Improvements in Automatic or Self-Acting Car-Brakes, of which the following is a specification.

My improved brake is intended to be entirely self-acting, and requires no connection with the brakes of other cars or with other cars themselves more than the regular couplings always used.

The invention may be stated in general to consist in combining with the longitudinally-movable draft or coupling bar of a railroad-car a brake mechanism operated to apply the brakes by a movement of the said bar in a direction contrary to that in which the car is moving, whether backing or going forward. The one upon the front end of the car only acts in this way, the one upon the other end acting in an opposite direction.

My invention can best be explained and understood by reference to the accompanying drawings, in which I have represented the manner of carrying the same into effect.

Figure 8:
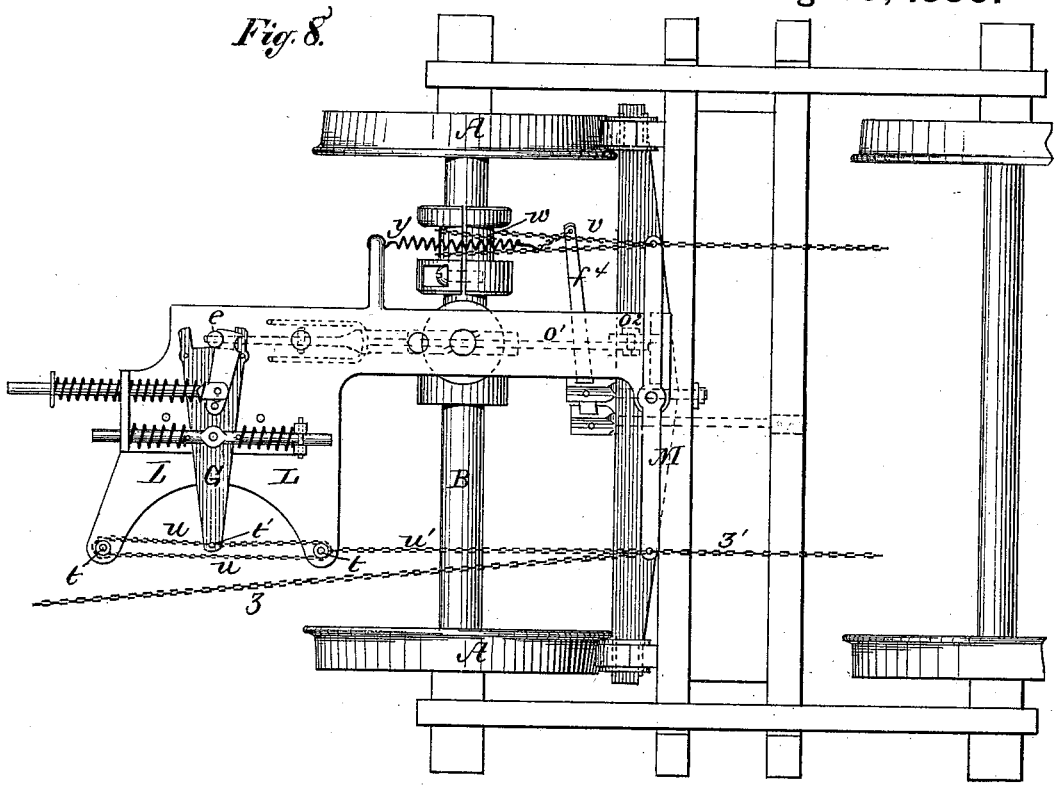
Figure 9:
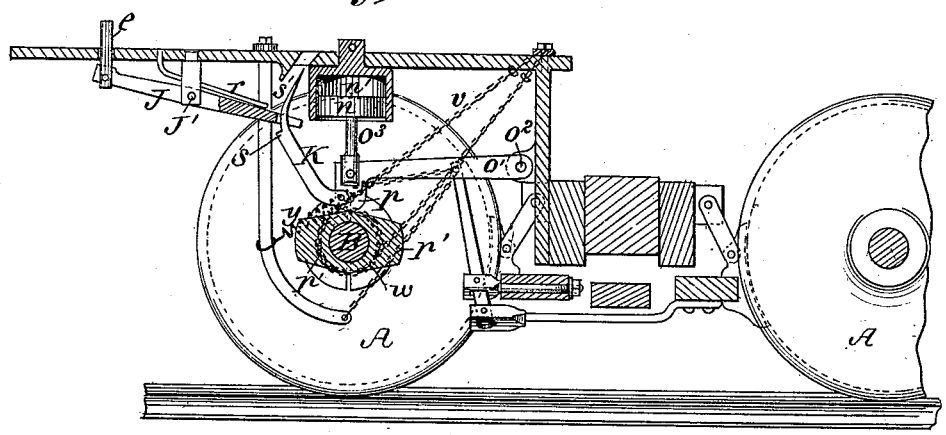
Figure 10:
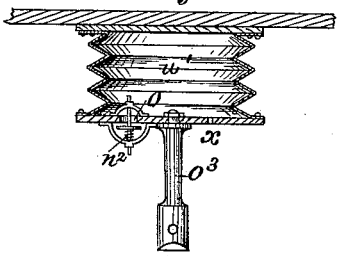

Figure 1 is a sectional side elevation of a portion of the truck-frame of a car provided with my improved brake. Fig. 2 is a sectional front elevation of the same. Fig. 3 is a plan of the same, partly in section. Figs. 4, 5, 6, and 7 are detail views. Figs. 8, 9, and 10 are views of one of the practical modifications of my brake, Fig. 8 being a plan, Fig. 9 a sectional side elevation, and Fig. 10 a detail view.

In the drawings, A are the wheels, B the axle, C the truck-frame, and D the brake-shoes, all of which are similar in their construction to those already in use.

The brake-levers, rods, &c., as shown, are, for convenience of illustration, somewhat different in their construction from those now used, but are not necessarily so, as my improvements may be adapted to the brake system already upon the cars in various ways; and my invention in this case is more especially intended to procure a motion that shall automatically apply brakes of various kinds at required times, this motion to be derived from the drawing or pushing, under certain circumstances, of the buffer or coupling or draw bar; as, for instance, when a train is running ahead, if steam be shut off and a brake applied to the engine the cars will push forward against the engine, and this pushing will cause the brakes upon the cars to be applied; or again, if a train is backing and the steam be shut off the engine and the brake applied to it, the cars will draw upon their couplings, and thereby apply the brakes, so that when a locomotive is propelling a train in either direction, any checking of its speed by its own brake will cause the brakes to be immediately applied to any cars in the train that may be fitted with my improved brake, so long as the motion of the locomotive continues to be retarded, and until the train is very nearly or quite at a stand still; but the loosening of the brake of the engine and the application of steam will immediately release the brake.

E is the buffer, and its bar, which passes through a piece, $b^2$, attached to the frame of the car, has about it two springs, $a$, one upon each side of the piece, so adjusted as to hold the buffer-bar, when no strain is exerted upon it, in a certain position. When, however, power is exerted upon the buffer-bar, either one or the other of the springs is compressed and the bar either drawn out or pushed back, according to which way the strain upon it may be. The inner end of the buffer-bar is pinned at $b$ to a small lever, F, and this lever at one end, $c$, to a larger lever, G. Neither of these levers has a rigidly-fixed position, the smaller one being free at one end to move between two pins, $d$, upon the large lever (subject to the restraint of a fulcrum-pin, $e$, to be hereinafter described,) but is held in a central position by the buffer-bar when no strain is exerted upon the buffer. The larger is free to move at either end (except that it is also subject to the control of the fulcrum-pin) and at the center, so far as the pin $b$ in the slot $b'$ in the piece or frame $b^2$ will allow it to go, but is held in a nearly central position by the two springs $a'$ and rod $a^2$, when no strain is exerted upon the buffer.

Jointed at $f^5$ to the narrower end of the larger lever is a rod, $f$, running to the end of another lever, $f'$, to which it is also jointed.

This lever $f'$ has a fulcrum, $f^2$, near its center, and at its other end it is pivoted to a rod, $f^3$, jointed at its ends to the brake-levers $f^4$.

The brake-levers have each a fulcrum-pin, $g$, working in a slot, $g'$, in such a way that while any outward push upon the lever has no effect upon the brake, a drawing toward the center applies the brake-shoes to the wheels, and consequently, whichever way the lever may be moved from a central position, the brake is applied by one or the other of the levers.

The fulcrum-pin $e$, coming up through a plate, $h$, fixed to or forming part of the car or truck-frame, is hinged or pivoted at its lower end, $h'$, to the horizontal portion of an L-shaped lever, H. This lever has its fulcrum $h^2$ at its elbow, and its other arm extends downward toward the axle of the car, and has at its lower end a semicircular flange, H′, whose axis corresponds with the axis of the car-axle. This flange has a semicircular recess, $i$, in its side, Fig. 5.

Passing at right angles through the axle of the car is a radial rod, $j$, and upon this rod are two cylindrical weights, $k$, one upon each side of the axle. These weights slide freely upon the rod between the axle and pins $k'$ in the ends of the rod, so that as the axle revolves the weights will be constantly changing their positions from the inner to the outer end of the rod, except that when the axle attains a high rate of speed the weights will be held out constantly by their centrifugal force.

Fitting about the axle sufficiently close to give a little friction when the axle revolves is a collar, I. This collar has two pins, $l$, projecting from its sides in such positions that they will come into contact with a fixed projection, $m$, and prevent the collar from revolving with the axle more than the distance between the two pins. At one end of the collar a semicircular flange, $n$, radiates from it. The outer periphery of this flange is just under the inner ends of the cylindrical weights when they are in their outermost positions, but is of a greater radius than the flange H′ upon the lever H. These two flanges and the weights and stop-pins are placed in certain relative positions to each other, so that as the axle revolves the collar will be carried around until one of the pins $l$ strikes the projection $m$, when the collar will have no more motion until the revolution of the axle is reversed. The flange $n$ will now be in a position as shown in Fig. 1, one of its ends being vertical and parallel with the recess in the flange, but sufficiently back of it, so that as the weight $k$ comes up with the revolution of the axle it will first slide in upon the pin $j$ until it rests upon the periphery of the flange $n$, upon which it will slide along until it comes to its end, when, if the train is going very slowly, it will drop off and into the recess $i$ on the other flange, H′. Then, as the axle continues to rotate, the weight will be rolled, passing out of the recess and, acting as a friction-roller, will push the lower end of the lever H away, and thus draw the fulcrum-pin $e$ down against the stress of the spring $e'$, which presses upward against the lever H. This will happen, however, only when the axle is revolving very slowly. When any considerable speed is attained the weights will not drop quickly enough after leaving the end of the flange $n$ to drop into the recess $i$ in the other flange, and they will consequently fall, if at all, upon the outside of the flange H′, and will have no effect upon the fulcrum-pin.

The operation of the brake is as follows: Supposing that both of the levers F G are in a central position, and that the train is at a stand-still. Now, if the engine be started and commences drawing the car, the buffer-bar will be drawn out until the pin $b$ comes to the forward end of the slot $b'$. The small lever F will be drawn forward against the front pin, $d$, upon the large lever G, and the fulcrum-pin $e$ will come up behind it. Now, if the engine continues drawing the two levers will be held forward; but as there is a considerable space upon the back side of the fulcrum-pin, it will have no effect upon the brake, or if steam be shut off, and the engine and cars run of their previously-acquired momentum at about a uniform speed, the levers will assume the position shown in Fig. 3, where the large lever is in a central position and the short lever ahead of the fulcrum-pin, but no power is exerted upon the brake. If, now, a brake be applied to the engine and its speed thereby retarded, the cars will press forward against it or against each other, and press back the buffer-bar, and as in Fig. 3 the wide ends of the levers were already back as far as the fulcrum-pin would allow them to go, this pressure will force back the longer end of the lever G and apply the brake through the medium of the brake rods and levers. (See Fig. 4.) This will continue while the brake is acting upon the engine, and until the axle revolves sufficiently slow to allow one of the weights $k$ to drop into the recess $i$, and by crowding out the lever H, draw down the pin $e$ and release the brake. This will not occur until the train has almost stopped—say upon the last one or two revolutions of the axle.

If the train be backed by the engine the action will be similar, except that the position of the levers and pins will be reversed and the brake will be applied by drawing out the buffer-bar instead of crowding it in.

Figure 6:
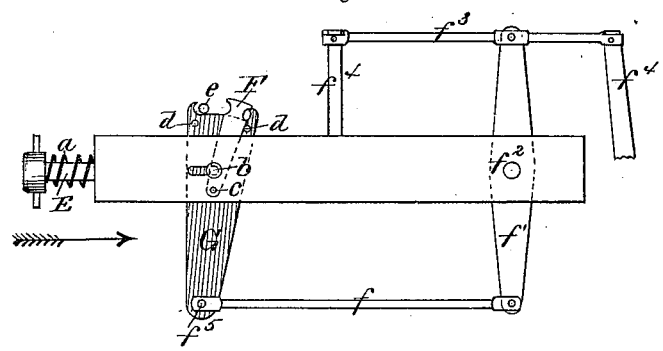
Figure 7:
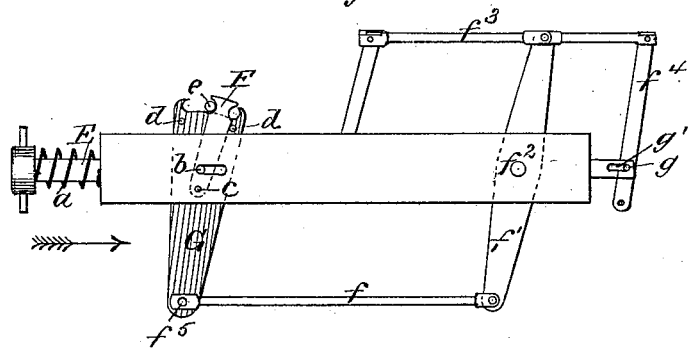

Fig. 6 shows the position when the engine is backing the train, and Fig. 7 the same when the brake is applied to the engine and the momentum of the cars draws out the buffer-bar and applies the brake to the cars. It is obvious that the action of this arrangement is similar if upon either end of the car. Thus, whether backing or going forward, so long as the speed of the engine is not suddenly checked, the pin $b$ will bear against one or the other end of the slot $b'$, and no effect will be had on the lever G, which will in effect move upon the pivot $f^5$ as a fulcrum without operating the brake-rods; but the moment speed is checked the buffer-bar is moved in a direction opposite to that in which the car is moving, and the leverage instantly changes, the pin e becoming the fulcrum, the resistance being at $f^5$ and the power being applied at b. The levers F and G are, in effect, one and the same so soon as they are once positioned, the lever F being employed in order that it may be shifted from one side to the other of the fulcrum-pin e, according to the direction in which the car is moving, the pin being on the rear side of the lever relatively to the movement of the car.

Various modifications of the different parts may be made—as, for instance, it may be preferable not to have the collar I run directly upon the axle B, but upon a separate concentric bearing, and to have a very small friction upon the axle to carry it to its proper position. Disks may be used instead of levers, and the motion procured by the levers may be made to apply the brake in various ways by clutches, by friction, or by levers. More than two of the cylindrical weights k may be employed. A latch may be made to hold the fulcrum-pin e down after it has been once drawn down until the axle again attains speed enough to prevent the weight dropping into the recess, when the weight will unlock it and allow the pin to rise. The lever should always be long enough, so that lost motion between the car-frame and truck will not materially affect the brake, and a chain may be made to connect the fulcrum-pin and its lever in order to allow for difference in motion.

Figs. 8, 9, and 10 show a practical modification of my improvements, in which different means are employed for drawing the pin and also for applying the brake.

A piston, n, working in a cylinder, n', Fig. 9, or a bellows-like diaphragm, Fig. 10, has a valve, which allows the air within the diaphragm or cylinder, as the case may be, to be expelled when the diaphragm or piston is pressed upward, said valve then closing by pressure of the spring $n^2$, to prevent the air from re-entering except through a small hole, x, in the diaphragm or piston, the fall or descent of the diaphragm or piston being thereby retarded and rendered slow.

A stud, o, reaches down from the diaphragm or piston, and has pinned to its lower end one end of a horizontal lever, o', the other end of this lever being pinned to the truck-frame at $o^2$. Either a lug, p, or a roller upon the lower side of the lever, directly under the stud o, rests upon the surface of a double cam, p', fast on the axle B.

The fulcrum-pin e has a straight lever, J, pinned to it, this lever having its fulcrum J' near its center, and a spring, r, presses against it to force the pin e upward.

A pawl, K, pivoted to the end of the lever o', rests in and against the forked free end of the lever J, and has a notch, s, in it, so that when the lever J is in its lowest position the notch will engage the end of the lever, as seen in Fig. 9, so that when the pawl is pressed up by the action of the cam p' this end of the lever will be forced up and the fulcrum-pin e consequently drawn down. Before the pawl reaches its highest point its upper end will come into contact with a projection, s', and will be forced away from the end of the lever J sufficiently to disengage the lever from the notch and allow the lever to fall. Now, if the axle has attained sufficient speed, air enough will not pass through the small hole x to allow the diaphragm or piston to drop entirely down before the cam p' again engages the roller or stud p and pushes it up, and consequently the notch in the pawl will not fall low enough to engage the end of the lever, and the fulcrum-pin will remain undisturbed.

A wide plate, L, carries two rollers, t, one on each side of and in line with the small end of the lever G. An endless chain, u, passes around these rollers, and one part is attached at t' to the end of the lever G. Directly behind the rear roller, when the lever is in its central position, another chain, w', is attached to chain u, so that any motion of the lever G in either direction will draw the chain w'. This chain is fastened to one end of a lever, M, which has its fulcrum at its center, and at the other end engages an endless chain, v, which passes loosely through a hole in that end of the lever. This endless chain v passes to and once around a collar, w, upon the axle B of the car. Each side of this chain is fastened to the brake-lever $f^4$, and each side has a spring, y, fastened to it, which pulls away from the lever M and brake-lever $f^4$, and has a tendency to keep the chain loose about the collar except when the lever M pulls upon the chain and draws out these springs, and then the chain is tightened about the collar, and the friction causes the chain to be wound up upon one side and unwound upon the other, and the drawing side will pull upon the brake-lever and apply the brake. As the chain winds with the axle it will run through the hole in the end of the lever M until one of two stops with which the chain is provided is reached, when the lever M will be drawn toward the axle, causing the chain to be somewhat loosened upon the collar, and prevent its further winding.

Friction-pieces may be placed between the chain r and collar w, to prevent friction upon the chain when the train is running and the brake not applied. The chains z run to a similar arrangement upon the other end of the car, and the chain z' to the hand-brake.

Having described my improvements, what I claim, and desire to secure by Letters Patent, is—

1. The combination of the longitudinally-movable coupler or buffer bar, the compound lever connected to the truck or car frame and with the buffer-bar, substantially as specified, the movable fulcrum-pin, the brakes, and means for connecting said brakes with the compound lever, the combination having the mode of operation substantially as herein set forth.

2. In combination, the longitudinally-movable buffer-bar, the fulcrum-pin, the compound lever movable to one side or the other of said fulcrum-pin and connected to the car or truck frame and the buffer-bar, substantially as specified, and springs whereby said lever is held in a central or nearly central position when not acted on by the buffer-bar, substantially as hereinbefore set forth.

3. The longitudinally-movable buffer-bar, the compound lever connected to said bar and to the car or truck frame, substantially as described, the brakes and means for connecting therewith said compound lever, in combination with the movable fulcrum-pin and mechanism, substantially as described, operated from the revolving axle of the car or truck to depress said pin and disengage it from the compound lever at the times and in the manner substantially as hereinbefore set forth.

In testimony whereof I have hereunto set my hand this 13th day of April, A. D. 1880.

BENJAMIN L. STOWE.

Witnesses:
NATHAN STOWE,
ROBERT SCOBIE.